United States Patent [19]

Hurst

[11] Patent Number: 4,693,832

[45] Date of Patent: Sep. 15, 1987

[54] PREPARATION OF SAFE DRINKING WATER

[75] Inventor: Marilyn M. Hurst, Hudson, Ohio

[73] Assignee: Quantum Technologies, Inc., Twinsburg, Ohio

[21] Appl. No.: 802,266

[22] Filed: Nov. 27, 1985

[51] Int. Cl.$^4$ ............................................... C02F 1/76
[52] U.S. Cl. .................................. 210/756; 210/752; 210/754; 426/66
[58] Field of Search ............... 210/756, 754, 764, 752; 423/473; 426/66, 67

[56] References Cited

U.S. PATENT DOCUMENTS

| | | | |
|---|---|---|---|
| 1,211,481 | 1/1917 | Noble | 210/756 |
| 1,413,153 | 4/1922 | Baker. | |
| 2,157,524 | 5/1939 | Cady | 23/152 |
| 2,240,344 | 4/1941 | Muskat et al. | 23/152 |
| 2,347,151 | 4/1944 | Crawford et al. | 23/152 |
| 3,170,883 | 2/1965 | Owen et al. | 210/756 |
| 3,616,385 | 10/1971 | Kloss et al. | 204/180 P |
| 3,943,261 | 3/1976 | Amon et al. | 210/756 |
| 4,243,525 | 1/1981 | Greenberg | 210/754 |
| 4,504,456 | 3/1985 | Yant et al. | 423/473 |

FOREIGN PATENT DOCUMENTS

| | | | |
|---|---|---|---|
| 456758 | 5/1949 | Canada | 210/754 |
| 60-110392 | 6/1985 | Japan | 210/754 |

OTHER PUBLICATIONS

Betz; "Handbook of Industrial Water Conditioning"; Seventh Edition; pp. 24-28 (1976).
Degremont; "Water Treatment Handbook"; pp. 229-233 (1973).
J.A.W.W.A. 71, pp. 87-95 (Feb. 1979)-"Chloroform Formation in Public Water Supplies" by Young, Jr. & Singer.
J.A.W.W.A. 76, pp. 68-75 (Feb. 1984)-"Control of Trihalomethane Precursors in Drinking Water" by Glaze & Wallace.

*Primary Examiner*—Benoit Castel
*Attorney, Agent, or Firm*—Arthur S. Collins

[57] ABSTRACT

A disinfection process is provided for preparing potable water having an unusually persistent and long lasting free available chlorine residual in order to assure safety and integrity of said water during its passage through the distribution system by which it is delivered to the consumer. The key step of this process is the generation of said unusually persistent free chlorine residual by mixing into a semi-finished water, which has already been pretreated specifically to satisfy substantially its immediate chlorine demand, dilute solution of HOCl having a pH between about 3 and about 6.

12 Claims, No Drawings

PREPARATION OF SAFE DRINKING WATER

This invention is concerned with the preparation of safe potable water of assured integrity for human consumption and having good organoleptic quality. It is particularly directed to an improved disinfection process for imparting a more lasting free available chlorine residual factor in a finished water supply so that a protective remnant thereof can survive in the water reaching even the most distant points in the distribution system without undesirably high chlorine residuals at the taps of the consumers located near the beginning of the system.

BACKGROUND OF THE INVENTION

Historically, the halogen family of elements has been closely linked to the chemical disinfection of water from its very beginnings. Although many alternative chemical disinfectants have been evaluated (e.g. ozone and hydrogen peroxide), chlorine in the elemental or hypochlorite salt forms continues to perform a dominant role in the water treatment field.

The sustained popularity of chlorine in this field for so many years is probably due to two main factors. These are the effective bactericidal action of free available chlorine in water even at relatively low levels and the excellent equipment that has been developed and used for handling chlorine and reliably dosing water with same. In any case, most of the present day potable water treatment plants use some form of chlorine for disinfection and rely upon the maintenance of a very substantial residual free available chlorine concentration in the finished water to insure ultimate delivery of a safe and sanitary product throughout the distribution system. Unfortunately, the inherent energetic reactivity of free available chlorine that is suggested by its strong bactericidal action is also reflected in other ways, notably in its instability and gradual loss from aqueous solutions and its chemical reactivity with a wide variety of both inorganic and organic constituents commonly encountered in raw source waters. As a result, the residual free available chlorine concentration in the finished water released from a modern treatment plant is generally maintained at a level of between about 1.0 and about 3.0 mg./liter, with the particular value chosen being dependent upon the expected rate of disappearance and residence times involved in the distribution system. The levels required tend to vary with water quality, which is subject to weather and seasonal changes due for example to the effects of temperature, sunlight, etc. on reaction rates, solubilities, etc.

In view of these generally accepted practices, the chlorine dosages required for sanitation, expecially in the summertime, frequently reach levels sufficient to create objectionable tastes and odors in the delivered product water. Accordingly and in line with the steady general trend toward minimizing levels of chemical additives in all products intended for human consumption, any measures capabable of reducing the chemical dosages applied in providing safe potable water would be most welcome and beneficial.

Moreover, within the last decade very serious concerns have been raised about the potential health hazards posed by the chlorinated organic compounds identified as trace contaminants in almost all municipal water systems. After due consideration of available scientific data and assessment of probable risks entailed, the U.S. E.P.A. has promulgated regulations setting a maximum level for "total trihalomethanes" (TTHM) in delivered drinking water of 0.10 mg./liter (equiv. to 100 ppb).

Naturally, the research efforts on this problem have consequently been greatly intensified in recent years also, and it has been pretty well established that the trihalomethane contamination problem (principally chloroform) is largely a result of in-situ formation thereof during the water treatment process as a result of the chlorination of organic precursors present in the source water. Some progress in reducing TTHM contamination has been achieved from such research as can be seen from periodical publications like the Journal of the American Water Works Assoc. (J.A.W.W.A.). Representative articles of this type are by Young et al (J.A.W.W.A. 71, 87-95, 1979) showing significant reductions achieved by suitable preclarification of the source water and solids removal prior to the application of chlorine thereto, and by Glaze et al (J.A.W.W.A. 76, 68-75, 1984) showing substantial additional reduction in THM precursors upon supplemental treatment of preclarified water with granular activated carbon and minor further reduction by adding a supplemental ozonization step.

However, such research papers as a whole actually tend to emphasize the extreme difficulty and extra expense involved in trying to meet the prescribed maximum TTHM limit of 0.10 mg./l in the final product water even when starting with a raw source water having only a medium content of organic constituents, i.e. between about 5 and about 10 mg./l of total organic carbon (TOC). Since source waters frequently reach TOC contents as high as about 20 mg./l or more, the urgent need for simple additional techniques and/or other practical and less expensive methods of diminishing the trihalomethane contamination levels in drinking water is readily apparent.

BRIEF SUMMARY OF THE INVENTION

The main object of this invention is to provide a process of preparing potable water wherein a vital disinfecting treatment is performed under conditions which produce an unusually stable and long lasting free available chlorine residual in the resultant disinfected water. A corollary object is to reduce the equivalent free available chlorine residual needed in the finished potable water released to a particular distribution system in order to insure safe biological quality throughout the entire system, thereby minimizing the amount of chlorine available for side reactions that produce undesirable byproducts and thus reducing exposure of the public to same.

I have discovered a method of preparing potable water whereby the above objects can be accomplished which comprises mixing into semi-finished water which has already been subjected to some chemical pretreatment an aqueous solution of HOCl having a pH between about 3 and about 6, (preferably between about 3.5 and about 5.5) in proportions sufficient to produce a substantial free available chlorine residual in the resultant disinfected water. Usually a free chlorine residual of at least about 0.5 ppm as measured about 30 to 60 minutes after said mixing will be desirable.

For most larger municipal water distribution systems the free available chlorine residual required in the finished water supplied thereto in order to safeguard the integrity of the water throughout the complete system will usually amount to at least about 1 ppm. Also, the treatment plants supplying the finished water for such systems are generally fully equipped and quite sophisticated so that the crucial disinfection treatment of this invention which employs an aqueous solution of hypochlorous acid having a pH between about 3 and 6 to produce the required free available chlorine residual will normally be preceded by multiple pretreatment steps including, for example, solids separation via coagulation, settling, filtering or the like and preliminary disinfection of some kind. Preferably, the preliminary disinfection will essentially satisfy the "immediate" chlorine demand of the water being processed (i.e. being same substantially to the so-called "break-point"). The "immediate" chlorine demand is the dosage needed to kill microorganisms and combine with highly reactive impurities in the water, so as to be largely consumed thereby within a matter of minutes (e.g. within about 30 minutes). These impurities are largely inorganics including ammonia and simple organics, mainly amines.

DETAILED DESCRIPTION OF THE INVENTION

The semi-finished water subjected to the disinfection treatment of this invention can be any source water which has been given some pretreatment of benefit in rendering it suitable for human consumption but which does not contain an adequate residual free available chlorine concentration for post-treatment protection during its distribution. Although surface waters generally stand to gain the most in quality from treatment in accordance with my invention, any source water (including ground water) can be upgraded significantly with regard to the ultimate quality of the finished potable water produced therefrom.

The total load and relative amounts of different types of impurities occurring in source waters can vary widely from place to place and from time to time due to natural climatic and seasonal differences as well as specific shifts in weather patterns and the amount of manmade pollution. Accordingly the sound application of modern water treatment principles necessitates a full examination and analysis of the raw water to be treated. For example, one of the more critical parameters normally measured before selecting and initiating disinfection treatment of a water supply is the "immediate chlorine demand" of the water, i.e. the amount of chlorine which is consumed almost immediately upon introduction to the water, i.e. within a period of only about 30 to 60 minutes. Unless this chlorine demand is relatively small (e.g. less than about 1 ppm) a prechlorination step at a fairly early stage in the process is usually advisable (e.g. just before, during or after coagulation and settling or similar clarifying or solids-removal steps that are usually involved in the purification of surface waters).

Preferably, therefore, the semi-finished water treated in accordance with this invention has already been subjected to preliminary disinfection substantially satisfying said "immediate chlorine demand." Other chemically reactive disinfectants, as well as elemental chlorine, can be used for same; for example, chlorine dioxide, hypochlorites, ozone, hypochlorous acid, hydrogen peroxide and potassium permanganate are all reactive toward at least some of the impurities responsible for said "chlorine demand".

In the vital supplemental disinfection of said semi-finished water responsible for imparting the unusually stable and long lasting free available chlorine residual, the aqueous solution of HOCl introduced thereto in accordance with my invention must have a pH of between about 3 and about 6. Preferably, the pH of said solution should be above about 3.5 in order to insure the absence of elemental chlorine in the solution as it is mixed into said semi-finished water. In fact, I have discovered that molecular (undissociated) hypochlorous acid (HOCl) is uniquely superior to both elemental chlorine ($Cl_2$) and the dissociated hypochlorite ion ($^-OCl$) with regard to the stability of a given free available chlorine residual level created in a given semi-finished water. Accordingly, the optimum range of pH for the aqueous hypochlorous acid solution employed in this invention is between about 3.5 and about 5.5.

I have also found that the persistence of a given free available chlorine residual imparted by an aqueous solution of HOCl having a pH level within the range specified herein tends to be reduced somewhat by the presence in said solution of major amounts of solutes other than HOCl. Ideally then, the molar concentration of even an inactive and neutral solute, such as NaCl, should not substantially exceed the molar concentration of the HOCl in said solution. For example, a satisfactory HOCl solution containing about equimolar amounts of HOCl and NaCl can be made by reacting low concentrations of $Cl_2$ and NaOH in water to form a solution of pH between 3 and 6.

As long as the specified pH range is observed, the exact concentration of the HOCl in said solution does not appear to be at all critical and, therefore, is largely open to the option of each individual user. However, in view of the small dosages involved, rather dilute aqueous solutions of HOCl are normally convenient to handle and inject so as to effect thorough and rapid intermixing with the semi-finished water. The most convenient concentrations of HOCl are normally within the range from about 0.5 to about 5 g per liter, but concentrations between 0.1 and 10 g per liter are also entirely feasible and useful in many situations.

For maximum stability of the free available chlorine residual produced by the process of this invention, the aqueous solution of HOCl employed should "consist essentially of" hypochlorous acid and water. As used herein the language "consists essentially of" means that any other substances than those specifically named are not present in amounts sufficient to interfere materially with the results obtained, i.e. sufficient to prevent attainment of a significant increase in stability of the resulting free available chlorine residual. Several methods of reducing concentrations of unwanted solutes from solutions of HOCl are available for use. For example, U.S. Pat. No. 2,347,151 of Crawford et al discloses a method of reducing the sodium chloride contamination of an aqueous solution of HOCl, which is based upon steam distillation of said solution using a large volume of chlorine as an inert auxiliary sweep gas. Another possible approach of this type employs anionic and/or cation-selective exchange substances (e.g. membranes) to remove unwanted solute material from HOCl solutions (See U.S. Pat. No. 3,616,385 of Kloss et al).

Alternatively, aqueous solutions of HOCl containing only minor proportions of all other solutes combined can also be produced directly. For example, U.S. Pat. Nos. 2,157,524 and 2,240,344 (Cady et al) disclose the formation of chlorine monoxide in dilute gaseous mixtures with chlorine and other diluents such as $CO_2$, followed by selective absorption of the chlorine monoxide in water to form extremely pure solutions of HOCl. Much more recently, Yant et al in U.S. Pat. No. 4,504,456 have produced very pure HOCl solutions by forming a gaseous mixture of HOCl and HCl by steam hydrolysis of $Cl_2$ gas and stripping HCl vapor from said mixture as solid NaCl by reacting same with a fluid bed of sodium carbonate salts and then absorbing the HOCl vapor which remains.

The semi-finished water treated in accordance with this invention will most advantageously be one that has already been subjected to primary treatment with an active disinfectant in proportions satisfying substantially all of the "immediate" chlorine demand but insufficient to establish a significant free available chlorine residual for protection of the finished water during its residence in the distribution system. For most urban water distribution systems, maximum residence times amount to from about 1 day to about 1 week and, accordingly, the free available chlorine residuals required in the finished water entering such distribution system generally run between about 0.5 and about 5 ppm, with levels between about 1 and about 4 ppm being most prevalent. The active chemical reagent used in effecting said preliminary disinfecting treatment is not critical so long as it substantially satisfies the immediate chlorine demand of the water without contributing a substantial free available chlorine residual in the finished water. Thus, any effective disinfectant, such as the hypochlorites, chlorine dioxide, chlorine, hypochlorous acid, ozone, hydrogen peroxide, etc. can be used, either alone or in combinations, for said predisinfection step.

Also, the semi-finished water treated in accordance with this invention is one that has generally been subjected to a solids removal step of some kind. This solids removal pretreatment usually involves use of chemical coagulant such as alum or ferric chloride, together with flocculation, sedimentation and/or filtration. In fact, the primary disinfection step can be and often is carried out together with or in close proximity to such solids separation step in approved water treatments currently being practiced.

Of course, the quality of raw waters available for treatment and upgrading into finished potable water varies tremendously depending particularly upon their source, but also upon weather, the season of the year and other natural as well as artificial factors. The amounts and types of impurities effectively determine not only the immediate potential for harmful chlorinated organic compounds to be formed therein by chlorination of the organic content of the water. The total amount of trihalomethanes (TTHM) produced, for example, has been found to depend not only on the concentration of organic matter or organic precursors in the water but also on such factors as temperature and the amount of free available chlorine residual in the finished water. Thus, it is clear that the chlorination reactions of organic matter that lead to THM formation are substantially slower than the chemical reactions that are responsible for "immediate" chlorine demand, so that THM's continue to be formed in the finished water during its stay within the distribution system. Accordingly, the U.S. E.P.A. regulations specify TTHM monitoring to include water samples drawn from representative points located throughout a potable water distribution system.

The process of this invention has been found to provide an unexpected increase in the persistence and lifetime of the active, free available chlorine residuals generated in a potable water in comparison with similar residuals produced in the same water employing aqueous solutions of elemental chlorine such as have heretofore been the reagents of choice for this purpose in the water treatment field. Thus, in controlled experiments providing direct head-to-head comparisons of dilute aqueous solutions of elemental chlorine versus similarly dilute aqueous solutions of HOCl having pH values between 3 and 6, when each is added to the same semi-finished water to provide similar initial levels of free available chlorine residual, the rate of loss from said initial levels over periods of 1 to 5 days was significantly higher in those water samples produced with the solutions of elemental chlorine, with the margin of difference running from about 10% to about 35%, depending upon the particular quality of the semi-finished water treated and other conditions of each test, such as initial levels of the free residual, temperature, residence time, purity of the HOCl solution used, etc.

When these results are translated into more practical considerations based upon the actual parameters employed in maintaining a safe potable water supply, the superiority of employing aqueous solutions of HOCl to provide the ultimate free available chlorine residual needed to insure the safety of the delivered water is even more dramatically portrayed. Thus the number of days over which a significant (e.g. 10%) remnant of the initial level of free available chlorine residual survives is approximately doubled when said HOCl solutions are used instead of a comparable solution of elemental chlorine. As a consequence of this prolonged survival of a significant remnant of chlorine residual, the initial level of free available chlorine residual needed can be reduced by about 30 to about 50% in most cases when the process of the present invention is used to provide a safe water supply by insuring a prescribed minimum free available chlorine level (e.g. at least 0.1 to 0.2 ppm) even in the most remote points in said system.

The following specific examples are provided to illustrate some of the benefits and advantages that can be realized by the practice of the present invention.

EXAMPLE 1

Surface water from a reservoir located by a river in northeastern Ohio was the source water for this example. Due to the excellent clarity and low "immediate" chlorine demand of the raw water, it was pretreated only by a primary disinfection step using a fresh dilute aqueous solution of elemental chlorine made by dissolving gaseous chlorine in distilled water. In this step, 6 milliliters of said solution containing about 5.6 grams of chlorine per liter and having a pH of about 1.5 were mixed into about 16 liters of the raw water thereby satisfying its immediate chlorine demand (free available chlorine residual after about 1 hour equal to about 0.1 ppm).

Equal samples (1 liter) of said pretreated water were then placed in two clean glass jars in preparation for secondary chlorination using different reagents to provide comparable levels of free available chlorine residual in said samples. One sample was dosed with about 3 ppm of chlorine using 0.53 milliliter of the same aqueous solution of elemental chlorine employed in the primary disinfection step while the other sample was dosed with an equivalent proportion of HOCl using 0.59 milliliter of a dilute aqueous solution of substantially pure hypochlorous acid prepared in accordance with the method disclosed in U.S. Pat. No. 4,504,456 and having a concentration equivalent, on the basis of free available chlorine content, to an aqueous solution containing 5.1 grams of elemental chlorine per liter.

About 30 minutes after intermixing each sample with its particular secondary chlorinating agent, the free available chlorine residuals in the treated water samples were determined and all reported in the usual terms "parts per million of equivalent $Cl_2$." The treated samples were then stored in a refrigerator for several days, being removed only to make follow-up determinations at 24 hour intervals of the free available residuals left in both samples. The results of these determinations are presented in the following table.

TABLE 1

| Time Elapsed | $Cl_2$ Treated Sample | | HOCl Treated Sample | |
|---|---|---|---|---|
| | Free Residual (ppm)* | % Lost (%) | Free Residual (ppm)* | % Lost (%) |
| Initial (30") | 1.92 | — | 1.84 | — |
| 1 Day | 0.56 | −71% | 0.72 | −61% |
| 2 Days | 0.18 | −91% | 0.48 | −74% |
| 3 Days | 0.08 | −96% | 0.28 | −85% |
| 4 Days | 0.02 | −99% | 0.22 | −88% |
| 5 Days | 0.0 | −100% | 0.24 | −87% |

*All residuals reported in terms of $Cl_2$ equivalents.

The data recorded in Table 1 above show that, under directly comparable conditions, the free chlorine residual imparted using elemental chlorine as the reagent disappeared at rates substantially faster than that generated using hypochlorous acid, namely 13 to 23% faster over the course of this five day test period. These data also indicate that a significant protective remnant (i.e. about 10%) of the original free residual produced by the elemental chlorine reagent barely survives for about 2 days compared to at least 5 days for one produced using HOCl.

EXAMPLE 2

The raw water used in this example was from the same supply reservoir described in Example 1. However, due to seasonally induced changes in impurity levels, both turbidity and "immediate" chlorine demand of this raw water were considerably higher. Accordingly, pretreatment in this case included both solids removal (by coagulation, sedimentation and filtration) and primary disinfection using a dose of about 2 ppm of $ClO_2$ in a freshly made dilute aqueous solution and a dose of about 6 ppm of elemental $Cl_2$ in a fresh dilute aqueous solution.

Equal samples of the pretreated water thus obtained were placed in six clean glass jars in preparation for secondary chlorination using three different reagents at two different dosages of each reagent to provide treated samples at two different comparable levels of free available chlorine residual generated from each of the three reagents.

Two of the reagents employed were substantially the same as those used in Example 1, namely a fresh dilute aqueous solution containing about 5.8 grams of $Cl_2$ per liter and a comparably dilute solution of substantially pure hypochlorous acid. The third reagent was a less pure solution of hypochlorous acid made by reacting 105 milliliters of dilute aqueous sodium hypochlorite solutions made with distilled water and containing 1.97 grams NaOCl per liter with 35 milliliters of the aforesaid dilute aqueous solution containing about 5.8 grams of $Cl_2$ per liter, yielding a solution having a pH of 4.5 and containing about 2.1 grams of HOCl and 1.1 grams of NaCl per liter.

Each of said three reagents was employed in two of said six water samples using proportions designed to produce comparable levels (in the 1–4 ppm range) of free available chlorine residual from each reagent. As in Example 1, about 30 minutes after intermixing each dose of each reagent with its respective sample of pretreated water and every 24 hours thereafter for several days, the free available chlorine residual in each sample was carefully measured. The results obtained are summarized in Tables 2A and 2B below.

A comparison of the percentages of the original free chlorine residuals lost after periods of from 1 to 5 days as recorded in these Tables shows that under comparable conditions, the rates of loss of said residuals in samples treated with elemental chlorine were at least about 33% faster than in those samples made using substantially pure HOCl solution as the chlorinating agent and at least about 20% faster than when impure HOCl solution was used as the chlorinating agent. Moreover, in some cases the rates of loss from the elemental chlorine treated samples were close to double the loss rates in comparable samples treated with pure or impure hypochlorous acids.

It can also be seen from the measurements over the 5 day period of free chlorine residuals as recorded in Tables 2A and 2B that the starting free chlorine residual required to produce a protective remnant of approximately 0.2 ppm of same at the end of 4 or 5 days using solutions of elemental chlorine is at least double that required using solutions of hypochlorous acid of either grade.

TABLE 2A

| Time Elapsed | $Cl_2$ Treated $H_2O$ | | HOCl Treated $H_2O$ | | Impure HOCl Treated $H_2O$ | |
|---|---|---|---|---|---|---|
| | Free Residual (ppm)* | % Lost (%) | Free Residual (ppm)* | % Lost (%) | Free Residual (ppm)* | % Lost (%) |
| Initial (30") | 1.60 | — | 1.60 | — | 1.68 | — |
| 1 Day | — | — | 1.44 | −10% | — | — |
| 2 Days | 0.36 | −78% | 0.92 | −42% | 1.00 | −40% |
| 3 Days | 0.21 | −87% | 0.85 | −47% | 0.83 | −51% |
| 4 Days | 0 | −100% | 0.56 | −65% | 0.48 | −77% |
| 5 Days | 0 | −100% | 0.40 | −75% | 0.28 | −83% |

*All reported in terms of $Cl_2$ equivalents.

TABLE 2B

| Time Elapsed | $Cl_2$ Treated $H_2O$ | | HOCl Treated $H_2O$ | | Impure HOCl Treated $H_2O$ | |
|---|---|---|---|---|---|---|
| | Free Residual (ppm)* | % Lost (%) | Free Residual (ppm)* | % Lost (%) | Free Residual (ppm)* | % Lost (%) |
| Initial (30") | 3.20 | — | 3.04 | — | 3.36 | — |
| 1 Day | 2.16 | −32% | 2.32 | −24% | 2.80 | −17% |
| 2 Days | 0.96 | −70% | 2.2 | −28% | 2.28 | −32% |
| 3 Days | 0.61 | −81% | 1.8 | −41% | 1.76 | −48% |
| 4 Days | 0.23 | −93% | 1.44 | −53% | 1.40 | −58% |
| 5 Days | 0.18 | −94% | 1.22 | −60% | 1.08 | −68% |

*All reported in terms of $Cl_2$ equivalents.

Many changes can be made from the specific embodiments and operating details of the present process as illustrated and described in the present specification without departing from the essential concept and teachings of the present invention. For example, although the key secondary disinfection step which generates the bulk of the available free available chlorine residual of a potable water supply in this invention is ideally suited for incorporation into the later stages of an overall potable water treatment program, it clearly need not be the final step of such a program. Obviously, various additives that are frequently used today for special effects can be added still later (e.g. in the final polishing stages), such as fluorides, pH control agents or the like, as well as minor additions of other specialized post disinfectants, such as chloramines, hydrogen peroxide, etc.

Having thus described by invention, including preferred embodiments thereof, what I claim is:

1. A disinfection process for preparing a potable water supply having a more stable and longer lasting residual germicidal activity for preserving its integrity and safety during distribution to the user comprising mixing into semi-finished water, produced by chemical pretreatment steps including primary disinfection but which lacks a significant free available chlorine residual, an aqueous solution containing between about 0.1 and about 10 grams per liter of HOCl and having a pH between about 3 and about 6 in proportions imparting a free available chlorine residual in the resultant water supply of at least about 1.0 ppm as determined about 30 to 60 minutes after said mixing.

2. A process as described in claim 1 wherein said pretreatment steps accomplished substantially complete satisfaction of the immediate chlorine demand.

3. A process as in claim 2 wherein said aqueous solution of HOCl consists essentially of hypochlorous acid and water.

4. A process as in claim 3 wherein said solution of HOCl contains a lesser proportion of all other solutes combined than of HOCl.

5. A process as in claim 3 wherein sodium chloride is the only extraneous solute in said solution which is present in molar proportions as great as the HOCl.

6. A process as in claim 1 wherein said primary disinfection is accomplished with one or more active reagents from the group consisting of hypochlorites, chlorine dioxide, chlorine, hypochlorous acid, ozone, hydrogen peroxide and potassium permanganate.

7. A process as described in claim 1 wherein said aqueous solution of HOCl has a pH of about 3.5 to about 5.5.

8. A process as in claim 7 wherein the concentration of HOCl in said solution is between about 0.3 and about 5 grams per liter.

9. A process as in claim 7 wherein substantially more than 1 day is involved in distribution of said water supply to many users and the proportion of HOCl mixed into said semi-finished water imparts a free available chlorine residual of between about 1 and about 4 ppm in the resultant finished water supply.

10. A process as in claim 1 wherein said semi-finished water has also been pretreated to effect removal of solid matter therefrom.

11. A process as in claim 10 which is carried out during the final stages of the complete process used to prepare the finished potable water supply.

12. In a disinfection process for preparing a municipal potable water supply having a free available chlorine residual greater than 1 ppm and of sufficient size and stability for a remnant thereof of at least about 0.2 ppm to survive throughout the distribution system by which said water supply is delivered, the improvement which comprises generating said free available chlorine residual by introducing an aqueous solution containing between about 0.1 and about 10 grams per liter of HOCl and having a pH between about 3 and about 6 into semi-finished water resulting from chemical pretreatments including primary disinfection and solids removal, said semi-finished water having substantially no immediate chlorine demand but lacking a significant free available chlorine residual.

* * * * *